Patented Mar. 31, 1936

2,035,502

UNITED STATES PATENT OFFICE 2,035,502

METHOD OF PREPARING PURIFIED PARA AMINO PHENOL

Iwan Ostromislensky and Alexander V. Tolstoouhov, New York, N. Y., assignors to Ostro Research Laboratories, Inc., New York, N. Y., a corporation of New Jersey No Drawing. Original application April 4, 1933, Serial No. 603,234. Divided and this application October 19, 1933, Serial No. 694,339

11 Claims. (Cl. 260—130.5)

This invention relates to a method of preparing a purified paraaminophenol and to the products obtained thereby characterized by pure white colorless crystals, and to methods of preserving them so that they do not decolorize when kept in a dry condition. It is particularly applicable to the preparation of amino thymol in a purified form and suitable for medicinal use, but is not restricted to this particular aminophenol. This is a division of our application Serial No. 603,234, filed April 4, 1933, which is now abandoned.

It has long been known that paraaminophenols are very unstable and readily decompose on exposure to air forming darkly colored impurities even to such an extent that it is often impossible to analyze them. The darkening appears to be due to the presence of a quinone which acts as an oxidizing agent and readily converts the aminophenol into a quinone and an imoquinone and is itself converted to a hydroquinone. These compounds react with one another and with the aminophenol to form other substances which constitute impurities.

Our invention is particularly applicable to para amino phenols having two alkyl groups substituted in the benzene ring, and is especially applicable to such phenols when the alkyl groups are adjacent the amino and the hydroxy group and opposite one another. Illustrations of such phenols are amino thymol, amino carvacrol, amino xylenol, amino hydroxy diethyl benzene, and amino hydroxy methyl amyl benzene, but is not restricted to them. An important part of our invention is the control of the degree of acidity and alkalinity of the solution in which the reactions take place.

Each one of these amino phenols has usually been prepared heretofore by treating the corresponding phenol, such as thymol, carvacrol, xylenol, etc. with nitrous acid to obtain the para nitrozo phenol. The nitrozo phenol was then reduced usually with tin and concentrated hydrochloric acid and sometimes with hydrogen sulfide. In each case the amino phenol resulting probably contained the corresponding hydroquinone together with imoquinone and some unreduced quinone. These substances reacted with the amino phenol and with one another to form indophenols, meri-quinone-imines and quinhydrones. These impurities may be removed from a dilute acid solution of the amino phenol by filtering or by extracting them with a solvent such as ether. If the acid salt of the amino phenol is then precipitated in fairly concentrated acid solution and filtered, excess soluble hydroquinone may be removed from the crystals by washing with 10% hydrochloric acid. These crystals may be dissolved in water and the base precipitated by alkalizing. However, it is very difficult, if not impossible, to obtain a pure base in this way because when an acid solution of amino phenol, even though absolutely pure, is alkalized sufficiently to precipitate the free base, quinone is apparently formed and this quinone seems to act catalytically to convert some of the amino phenol, thus producing additional impurities. Such reactions are relatively slow at pH below 8 and increase rapidly as the pH is raised, and is extremely rapid above pH 9. If the alkalinity becomes sufficiently high to dissolve the amino phenol the solution immediately becomes yellow, which is the characteristic color of quinone. The quinone and other impurities being insoluble are precipitated with the base and it is almost impossible to extract them from the base probably because these compounds are of about the same degree of solubility as the amino phenol in organic solvents, such as either, benzene, chloroform, ligroin, alcohol, etc. Such a base, even though precipitated at pH 8, darkens rapidly during drying, or at least takes on a bluish tinge in a very few days. In the case of amino thymol the base prepared by processes heretofore known usually has a melting point ranging from 166 to 174° C., whereas the product obtained by our process has a melting point of 179° C.

Heretofore attempts have been made to produce pure amino thymol by dissolving carvoxime in concentrated sulphuric acid saturated with sulphur dioxide and precipitating the resulting amino thymol by partially neutralizing with ammonia. These attempts have not been successful and did not produce pure amino thymol, but, on the contrary, produced amino thymol which melted considerably below the melting point of the pure product. The pH of the solution from which the amino thymol was precipitated was not correct and recrystallization removed material that should not have been removed.

In carrying out our invention we have found that it is extremely advantageous to supply a reducing agent at all times while the amino phenol is in the presence of alkaline solution. By having a reducing agent present and by carefully controlling the pH the impurities are made soluble, and can thus be readily removed from the precipitated amino phenol.

Quinones in general are insoluble in water and in acids and bases, whereas hydroquinones are quite soluble in water and considerably more soluble in weak bases. Quinones are immediately converted into hydroquinones in the presence of reducing agents. Based on these facts, we have devised a method of obtaining a very pure amino thymol from which the impurities have been removed.

An acid solution of pure amino thymol, for instance, may be prepared as follows: An impure amino thymol obtained by any of the well known methods is dissolved in a dilute acid solution such as HCl, for example. The solution should contain only enough acid to form the salt of the amino thymol with very little free acid present, say pH 1.5 to 2.5. Insoluble impurities may be removed from this solution by filtering or extracting. The solution is then alkalyzed in the presence of a reducing agent. This can be done by adding sulphurous acid to the already acid solution or by using sulphurous acid as the dissolving agent and precipitating by ammonia or an alkali such as ammonium, sodium or potassium carbonate, or bicarbonate or dilute ammonium, sodium or potassium hydroxide. During the alkalyzing step great care should be taken to prevent the pH from increasing above 8, as the pH of the final solution is likely to rise very rapidly. The same result may be accomplished by neutralizing the acid solution with a reducing salt such as sodium sulphite or bisulphite or potassium meta bisulphite. The precipitated base of amino thymol is then removed by filtering, and may be washed with a faintly alkaline and faintly reducing solution. For this purpose we prefer sodium sulphite, sodium bisulphite or ammonium sulphite. The base is then removed and dried. The final product will not turn dark on exposure to air, first because the quinone and other darkening impurities which formed while the substance was in acid solution has been removed by being converted into soluble hydroquinone, and other soluble products and washed out and, second, because there is present in the final product about 1% of the reducing agent used which tends to counteract any oxidizing action that might otherwise occur.

A further purification may be effected if desired by dissolving this product in dilute acid as before and again precipitating and washing with an alkaline reducing agent.

The following specific examples are given as illustrative of the invention:—

*Example 1.*—Dissolve 165 grams of amino carvacrol in 2000 cc. of 3% sulphuric acid. Extract insoluble impurities as previously explained and add sufficient 20% sodium sulphite solution to bring to pH 8. Filter the precipitated amino carvacrol and dry in a vacuum dryer.

*Example 2.*—Dissolve 165 grams of amino thymol in 2000 cc. of 2% hydrochloric acid. Extract insoluble impurities as previously explained and add to the filtrate sufficient sodium sulphite to bring to pH 8. Filter off the precipitated amino thymol. Wash with 250 cc. 2% sodium bisulphite solution and dry in a current of dry air.

*Example 3.*—Place 132 grams of finely divided 2,5, dimethyl 4 amino phenol in 1500 cc. water and bubble through the mixture $SO_2$ until almost completely dissolved. Remove insoluble impurities by filtering and bring to pH 8 by adding sufficient 10% ammonia solution. Filter off the precipitate and dry in a current of dry air.

It has been found that the amino phenols purified in accordance with this invention, and also their acid salts are very suitable as internal antiseptics, particularly for diseases of the urinary tract. The amino thymol in the form of its hydrochloride will kill in vitro staphylococcus albus, staphylococcus aureus and streptococcus hemolyticus, for example, in dilution of 1:100,000 within twenty-four hours. It will also kill bacillus coli, which is a very resistant organism, in dilutions of 1:40,000 in the same time. The purified product may be administered in large doses over long periods of time without causing any harmful effects to the stomach or organs of the urinary tract. Rabbits tolerate doses as high as 0.5 grams per kilo of body weight administered daily over a period of four weeks without any visible irritation of the urinary tract.

In carrying out this invention it has been found that the amino thymol begins to be precipitated from the acid solution when the pH reaches 4. However, the alkalinity should preferably be increased during the precipitating step until it reaches about pH 8. Apparently a very advantageous result is produced during the portion of the precipitating step during which the pH is above about 6 and below 8.2. Such a procedure results in obtaining a product that is very much more pure than those heretofore obtained, or of considerably higher melting point than would be the case if the alkalinity is not permitted to reach more than pH 6.

It has also been found in carrying out this invention that the impurities which are to be removed after the impure product has been dissolved in the dilute acid solution are sometimes not entirely insoluble but appear to form colloidal solutions. In such cases the colloidal solution should be broken, for instance, by boiling or in some other suitable way so that the impurities can be more readily extracted from the solution as, for example, by filtration.

By the expression "alkali metal" in the claims it is intended to include the alkali metals of the first group and ammonia.

We claim:

1. The process of removing from a para amino phenol products resulting from oxidation of the amino phenol, which comprises dissolving the impure product in a dilute non-oxidizing acid solution having a pH between about 1.5 and about 2.5, extracting insoluble impurities and precipitating by alkalizing the solution to a pH of approximately 8 in the presence of an alkali metal salt of sulfurous acid.

2. The process of removing from a para amino phenol having two alkyl groups substituted in the benzene ring products resulting from oxidation of the amino phenol, which comprises dissolving the impure product in a dilute non-oxidizing acid solution having a pH between about 1.5 and about 2.5, extracting insoluble impurities and precipitating by alkalizing the solution to a pH of approximately 8 in the presence of an alkali metal salt of sulfurous acid.

3. The process of removing from amino thymol products resulting from oxidation of amino thymol, which comprises dissolving the impure material in dilute non-oxidizing acid having a pH between about 1.5 and about 2.5, extracting insoluble impurities, and precipitating by alkalizing to about pH 8 in the presence of an alkali metal salt of sulfurous acid.

4. The process of removing from amino thymol products resulting from oxidation of amino thymol, which comprises dissolving the impure material in dilute hydrochloric acid, extracting insoluble impurities and precipitating with a solution of a sulfite of an alkali metal at pH of about 8.

5. The process of removing from amino thymol products resulting from oxidation of amino thymol, which comprises dissolving the impure material in dilute hydrochloric acid, extracting insoluble impurities, precipitating with a solution of a sulfite of an alkali metal at pH of about 8, and filtering.

6. The process of stabilizing a purified para amino phenol, which comprises admixing therewith an alkali metal salt of sulfurous acid.

7. The process of stabilizing a purified para amino thymol, which comprises admixing therewith an alkali metal salt of sulphurous acid.

8. The process of purifying para amino thymol by removing products resulting from oxidation of amino thymol, which comprises precipitating the product from an aqueous solution by alkalizing to a pH of about 8, filtering and drying in the presence of an alkali metal salt of sulfurous acid.

9. The process of purifying para amino thymol by removing products resulting from oxidation of amino thymol, which comprises precipitating the product from an aqueous solution by alkalizing to a pH of about 8, filtering and drying in the presence of a sulphite of an alkali metal.

10. The process of stabilizing para amino thymol after removing products resulting from oxidation of amino thymol to purify the material which comprises drying the purified material in the presence of an alkali metal salt of sulphurous acid in such a manner that the dried material contains active quantities of said reducing agent.

11. The process of stabilizing para amino thymol, which comprises drying the purified material containing a sulfite of an alkali metal.

IWAN OSTROMISLENSKY.
ALEXANDER V. TOLSTOOUHOV.